US010061474B2

(12) United States Patent
Bertoldo et al.

(10) Patent No.: US 10,061,474 B2
(45) Date of Patent: Aug. 28, 2018

(54) OVERHEAD IMAGE VIEWING SYSTEMS AND METHODS

(71) Applicant: Planet Labs, Inc., San Francisco, CA (US)

(72) Inventors: Greg Bertoldo, Oakland, CA (US); Carlos Cervantes, San Mateo, CA (US); Richard J. Cirminello, Jr., San Jose, CA (US); James Long, Santa Clara, CA (US); Julian Mann, Menlo Park, CA (US); Daniel Berkenstock, Menlo Park, CA (US); Oliver Guinan, Redwood City, CA (US); Ching-Yu Hu, Menlo Park, CA (US); Adam Wegel, San Francisco, CA (US); Christopher Kelley, Mountain View, CA (US)

(73) Assignee: Planet Labs, Inc., San Francisco, CA (US)

( * ) Notice: Subject to any disclaimer, the term of this patent is extended or adjusted under 35 U.S.C. 154(b) by 49 days.

(21) Appl. No.: 13/886,055

(22) Filed: May 2, 2013

(65) Prior Publication Data

US 2013/0298083 A1 Nov. 7, 2013

Related U.S. Application Data

(60) Provisional application No. 61/689,794, filed on Jun. 12, 2012, provisional application No. 61/642,766, filed on May 4, 2012.

(51) Int. Cl.
*G06F 3/0482* (2013.01)
*G06F 3/0487* (2013.01)
(Continued)

(52) U.S. Cl.
CPC ........ *G06F 3/0482* (2013.01); *G06F 3/04847* (2013.01)

(58) Field of Classification Search
CPC .......................... G06F 3/04842; G09B 29/003
(Continued)

(56) References Cited

U.S. PATENT DOCUMENTS 6,421,610 B1 7/2002 Carroll et al.
6,456,299 B1 * 9/2002 Trombley .............. G09B 29/00
345/629
(Continued)

FOREIGN PATENT DOCUMENTS

JP 2010060294 A * 3/2010
WO WO 2013/166322 11/2013

OTHER PUBLICATIONS

"A First Look at the Book Module and Map Module in Adobe Photoshop Lightroom 4" Mar. 6, 2012, available at <URL=http://www.adobepress.com/articles/article.asp?p=1842937> last accessed Dec. 13, 2014.*

(Continued)

*Primary Examiner* — Doon Chow
*Assistant Examiner* — James T Tsai
(74) *Attorney, Agent, or Firm* — Dority & Manning, PA (57) ABSTRACT

Systems and methods for providing a user interface for searching, browsing, and ordering overhead (e.g. aircraft or satellite) imagery are provided. The user interface provides a map and search bar for searching and browsing images. Images may be presented to a user based on a selected and/or displayed geographic region of interest. Browsing to a different geographic region of interest may dynamically and automatically update the images presented. The user interface allows the user to select an image for viewing and/or purchase. Selection of an image overlays the image on the (Continued)

map, aligned with the geographic region which the image captures. Closing the selected image re-centers and re-zooms to the original display. Presented images can be filtered based on several criteria. Images can include still images and/or videos.

20 Claims, 7 Drawing Sheets

(51) Int. Cl.
  *G01C 11/02* (2006.01)
  *G01C 21/00* (2006.01)
  *G06F 3/0484* (2013.01)
(58) Field of Classification Search
  USPC .......................................................... 715/835
  See application file for complete search history.

(56) References Cited

U.S. PATENT DOCUMENTS

| | | | |
|---|---|---|---|
| 6,504,571 | B1 | 1/2003 | Narayanaswami et al. |
| 6,601,059 | B1 | 7/2003 | Fries |
| 7,009,619 | B2 | 3/2006 | Akitsune et al. |
| 7,239,760 | B2 | 7/2007 | Di Bernardo et al. |
| 7,555,725 | B2* | 6/2009 | Abramson et al. ........... 715/781 |
| 7,577,937 | B2* | 8/2009 | Henke et al. ................. 717/110 |
| 7,657,124 | B2 | 2/2010 | Turner et al. |
| 7,729,561 | B1 | 6/2010 | Boland et al. |
| 8,219,318 | B2* | 7/2012 | Kreft ............................ 701/445 |
| 2003/0040971 | A1 | 2/2003 | Freedenberg et al. |
| 2003/0044085 | A1 | 3/2003 | Dial, Jr. et al. |
| 2006/0133694 | A1* | 6/2006 | Dewaele .................. G06K 9/64 382/294 |
| 2006/0197781 | A1* | 9/2006 | Arutunian ............... G01C 21/32 345/629 |
| 2007/0180131 | A1 | 8/2007 | Goldstein et al. |
| 2008/0040028 | A1* | 2/2008 | Crump .......................... 701/208 |
| 2008/0063237 | A1 | 3/2008 | Rubenstein |
| 2008/0155060 | A1* | 6/2008 | Weber ................. G06F 17/3089 709/218 |
| 2009/0005968 | A1 | 1/2009 | Vengroff et al. |
| 2009/0024476 | A1* | 1/2009 | Baar ....................... G06Q 30/02 705/14.53 |
| 2009/0027418 | A1* | 1/2009 | Maru ................ G06F 17/30241 345/629 |
| 2009/0187575 | A1 | 7/2009 | DaCosta |
| 2009/0210388 | A1* | 8/2009 | Elson et al. ....................... 707/3 |
| 2009/0284551 | A1 | 11/2009 | Stanton |
| 2010/0058225 | A1* | 3/2010 | Lin .................... G01C 21/3682 715/785 |
| 2011/0007094 | A1 | 1/2011 | Nash et al. |
| 2012/0059576 | A1* | 3/2012 | Lee et al. ...................... 701/409 |
| 2012/0213416 | A1* | 8/2012 | Lorimer et al. .............. 382/113 |
| 2012/0221595 | A1* | 8/2012 | Slowe .................... G06Q 10/02 707/769 |
| 2013/0051661 | A1 | 2/2013 | Robinson et al. |
| 2013/0250104 | A1* | 9/2013 | Williams .............. G06T 3/4061 348/144 |
| 2014/0027576 | A1 | 1/2014 | Boshuizen et al. |

OTHER PUBLICATIONS

International Search Report and Written Opinion of the International Searching Authority for International Application No. PCT/US2013/039320, dated Oct. 4, 2013.
DataDoors for Direct Receiving Stations, Informational Brochure, i-cubed, LLC, retrieved from http://www.i3.com/products/software-applications/datadoors (last accessed Apr. 20, 2012) (2 pages).
DataDoors Cloud and Deployed GeoCMS, Informational Brochure, i-cubed, LLC, retrieved from http://www.i3.com/products/software-applications/datadoors (last accessed Apr. 20, 2012) (2 pages).
Harnessing the Cloud for Spatial Data Management, Vector1 Media, May 2010 (4 pages).
GeoFuse GeoEye Online Maps, User Interface Screen Captures, retrieved from http://geofuse.geoeye.com/maps/Map.aspx (last accessed Jan. 2, 2013) (3 pages).
GeoStore Services Order Online, User Interface Screen Captures, retrieved from http://geostore.astrium-geo.com/en-NA/278-order-online , (last accessed Jan. 2, 2013) (3 pages).
Google Earth, User Interface Screen Captures, retrieved from software program running on Windows 7, (as generated Jan. 2, 2013) (2 pages).
SPOTCatalog Location Search, User Interface Screen Captures, retrieved from http://catalog.spotimage.com/PageSearch.aspx (last accessed Jan. 2, 2013) (4 pages).
TerraFly Databases Home Page, User Interface Screen Captures, retrieved from http://terrafly.com, (last accessed Jan. 2, 2013) (1 page).
TerraServer Imagery Search, User Interface Screen Captures, retrieved from http://www.terraserver.com, (last accessed Jan. 2, 2013) (4 pages).
USGS Earth Explorer, User Interface Screen Captures, retrieved from http://earthexplorer.usgs.gov, (last accessed Jan. 2, 2013) (5 pages).
Anselin, L., et el., "GeoDa: An Introduction to Spatial Data Analysis," May 5, 2004, published in Geographical Analysis, Jan. 2006, pp. 5-22, vol. 38.
Environment Research Systems, Inc. (ESRI), "ArcGIS Map Examples", accessed at http://www.esri.com/software/arcgis/take-a-look-at-web-mapsx on Jul. 17, 2012.
Google, Inc. "Google Earth, View of American Museum of Natural History", accessed at http://maps.google.com on Jul. 17, 2012.
InfoChimps, Inc., "Geocoding API," accessed at www.infochimps.com/datasets/geocoding-api on Jul. 17, 2012.
OpenStreetMap, "Free Wiki World Map," accessed at http://www.openstreetmap.org/ on Jul. 17, 2012.
Quantum GIS Project, "QGIS 1.8 release", accessed at http://qgis.org/en/sponsorship/149.html on Aug. 29, 2012, in 13 pages.
United States Geological Survey, "Map Locator & Downloader," accessed at http://store.usgs.gov/b2c_usgs/usgs/maplocator/(xcm=r3standardpitrex_prd&layout=6_1_48&uiarea=2&ctype=areaDetails&carea=%24ROOT)/.do on Jul. 17, 2012.
U.S. Appl. No. 61/675,730, filed Jul. 25, 2012, titled *Low Cost Earth Observation Constellation Methodology and Applications* in 15 pages.

\* cited by examiner

OVERHEAD IMAGE VIEWING SYSTEMS AND METHODS

CROSS-REFERENCE TO RELATED APPLICATIONS

This application claims the benefit of priority under 35 U.S.C. § 119(e) of U.S. Provisional Application No. 61/642,766, filed May 4, 2012, and U.S. Provisional Application No. 61/689,794, filed Jun. 12, 2012, both entitled OVERHEAD IMAGE VIEWING SYSTEMS AND METHODS, the disclosures of which are hereby incorporated by reference in their entireties.

BACKGROUND

Capturing overhead images of geographic regions, typically by satellites or aircraft, and providing the images to interested parties has become a popular service in recent years. Such images can be of interest to a wide variety of individuals and organizations, including geographers, researchers, meteorologists, scientists, map service providers, government agencies, and amateur photography enthusiasts, to name a few. The character and quality of these overhead images can vary widely, depending on multiple factors including lighting, elevation, cloud cover, and the equipment used to capture the image. There can be thousands of unique overhead images for a particular geographic region. Consequently, some service providers have implemented web sites and other types of interactive systems for searching and viewing overhead images.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

The present disclosure provides an overhead image viewing system and associated user interface that enable users to seamlessly browse overhead images (e.g. satellite images) in context while browsing a map, and select an overhead image to view detailed information and/or to purchase. The user interface enables users to browse seamlessly by dynamically retrieving and providing overhead images corresponding to a currently displayed geographic region of interest; by displaying a selected overhead image overlaid on and contextually blended with the geographic region associated with the overhead image; and by automatically re-centering the displayed map when users return to the main view. Accordingly, certain embodiments of the overhead image viewing system allow the user to continuously view and select overhead images while remaining in the context of a map display of a geographic region of interest (which may change as the user pans the map or searches for a new region).

The user interface may be used with any type of interactive system (such as a web site, a mobile application based system, or an interactive television system) that generates a user interface for browsing a map or geographic region of interest and overhead images corresponding to a particular geographic region of interest and/or search filter criteria. For example, the user interface may be part of an interactive system, such as the interactive system 700 of FIG. 7, that provides functionality for users to browse, select, and/or purchase overhead images from an electronic catalog or database. The overhead images may, for example, include satellite images captured by satellites in earth-orbit, or other overhead images captured by aircraft (e.g., airplanes, helicopters, drones, unmanned aerial vehicles (UAV), balloons, etc.) surveying a geographic region, and the like. Each overhead image may also be associated with metadata related to the image, including for example how the image was captured, the conditions under which the image was captured (e.g. cloud cover, camera angle, elevation, spectral bandwidth (e.g., visible, red, green, blue, infrared, etc.)) where the image is stored or located, and details about the image itself (e.g. size, resolution), and so forth. As used herein, the interactive system may also be referred to interchangeably as an overhead image viewing system.

Examples of User Interfaces for Overhead Image Viewing Systems

Figure 1:
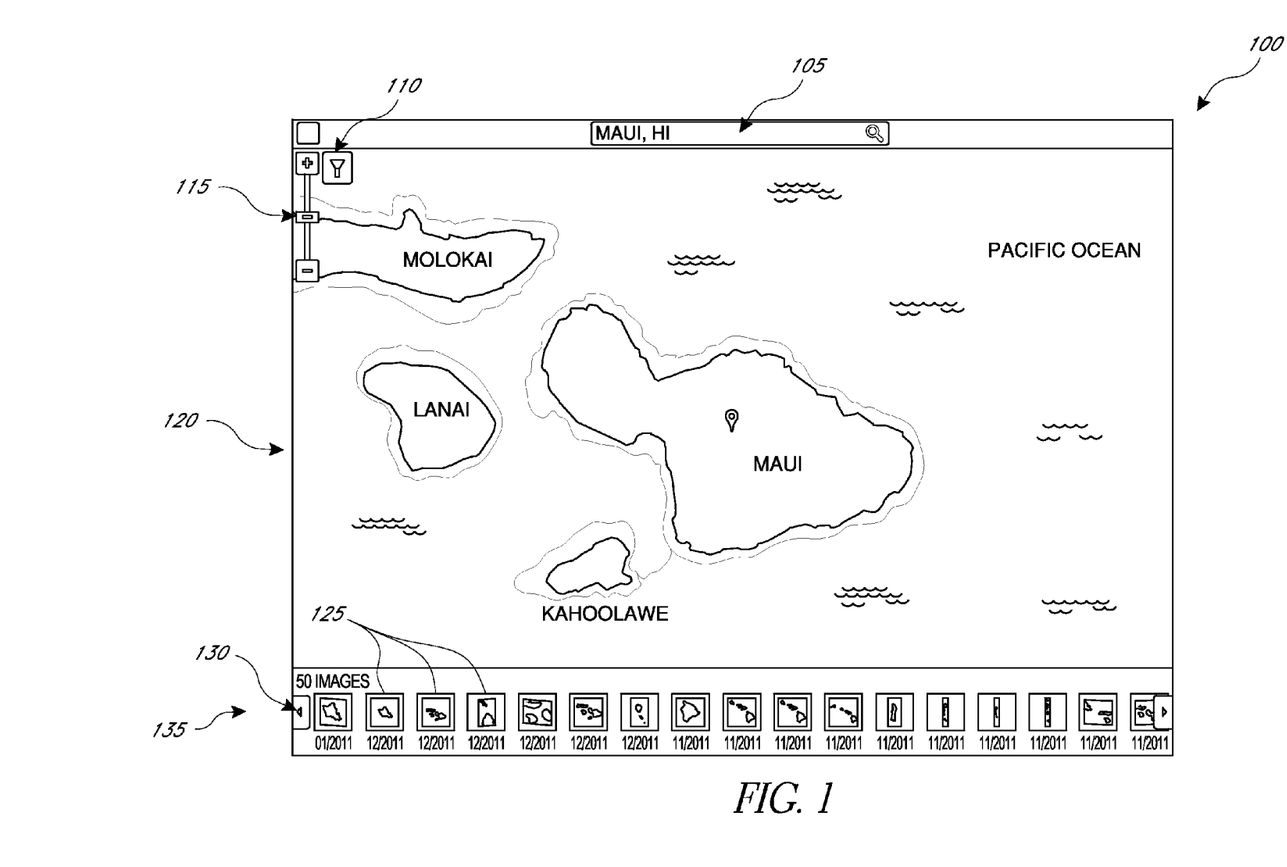
FIG. 1 illustrates one embodiment of a user interface that enables a user to browse overhead images for a geographic region of interest and to select images for detailed viewing.
Figure 2:
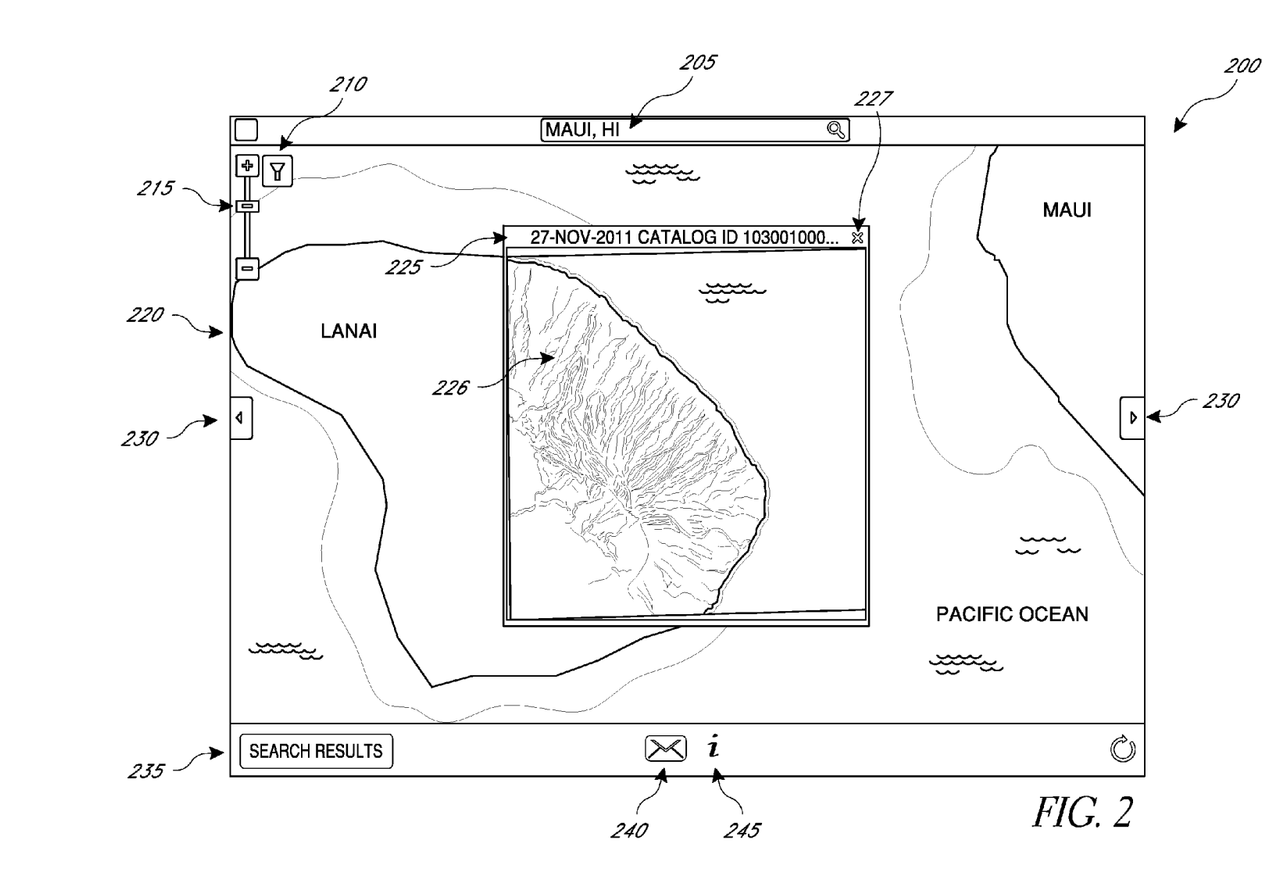
FIG. 2 illustrates one embodiment of a user interface that enables a user to view detail for a selected overhead image for a geographic region of interest and to continue browsing overhead images.
Figure 3:
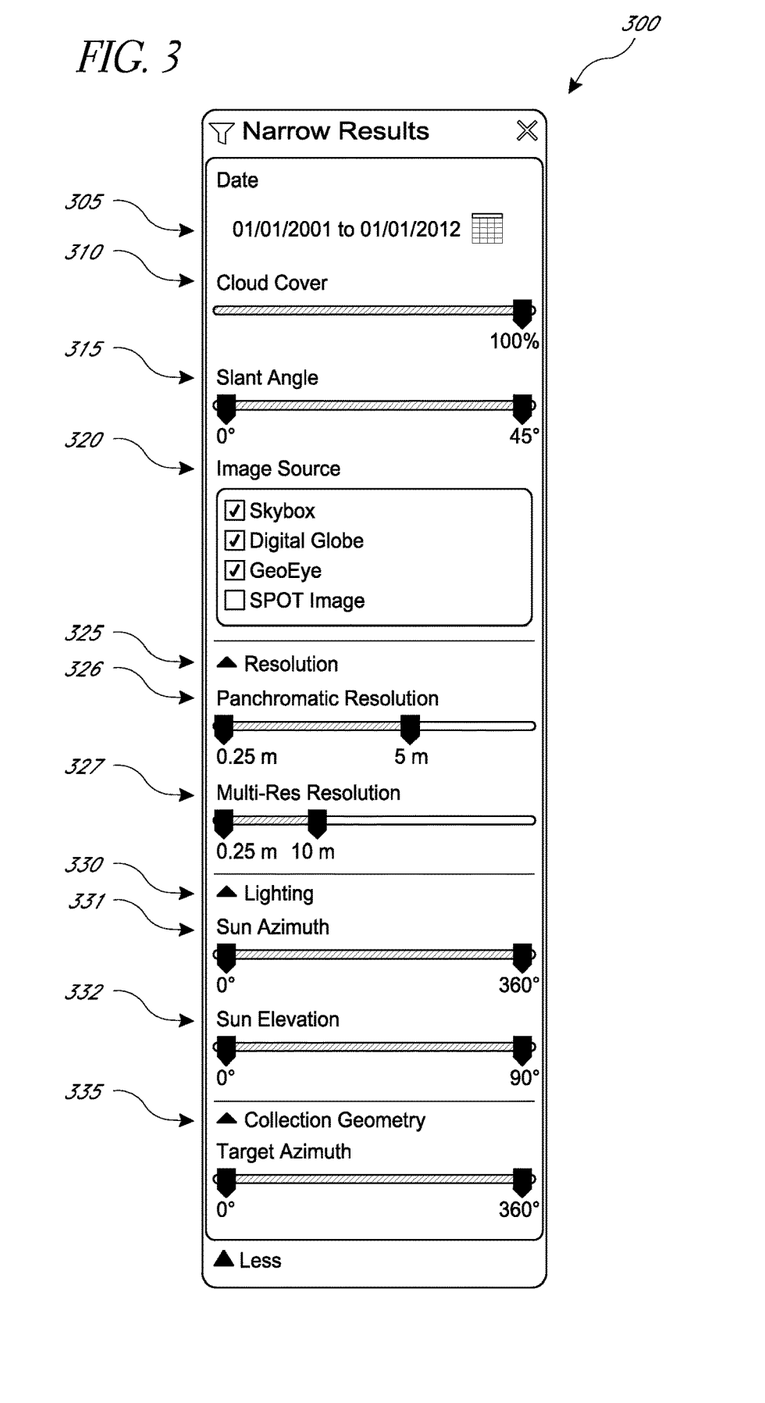
FIG. 3 illustrates one embodiment of a user interface that enables a user to filter search criteria for browsing overhead images for a geographic region of interest.

FIGS. 1, 2, and 3 illustrate several sample overhead image viewing user interfaces with various user interface controls to enable functionality as described in this specification. In various embodiments, the user interfaces shown in FIGS. 1, 2, and 3 may be presented as a web page, as a mobile application, as a stand-alone application, or by other communication means. The user interfaces shown in FIGS. 1, 2, and 3 may be generated and provided by, for example, the interactive system 700 of FIG. 7 or one of its components, such as an image view module 790. In other embodiments, analogous interfaces may be presented using audio or other forms of communication. In an embodiment, the user interfaces shown in FIGS. 1, 2, and 3 are configured to be interactive and respond to various user interactions. Such user interactions may include clicks with a mouse, typing with a keyboard, touches and/or gestures on a touch screen and/or touch sensitive computing device, voice commands, and/or the like. The systems and methods described herein are compatible with various types of input in addition to, or as a replacement for, the user input and interactions described herein.

FIG. 1 illustrates one embodiment of a user interface, and more specifically, illustrates a geographic region view page 100 for browsing overhead images or videos for a geographic region of interest and for selecting images or videos for detailed viewing and/or purchase. As will be recognized, the user interface may alternatively be implemented without using web pages. For example, the user interface may be implemented within a mobile application (such as a smartphone application), or within the native software of an e-book reader or a tablet computing device.

As depicted in FIG. 1, the geographic region view page 100 displays a map 120 and a set of overhead images 125 (displayed as thumbnail images) corresponding to the geographic region represented by the map 120, and provides the ability to select one such overhead image for further viewing. The overhead images 125 can also include overhead videos of a region of interest. A video can be displayed in the user interface as a thumbnail image of a frame from the video, and in some cases, may include a graphic element (e.g., an icon) to indicate the image represents a video rather than a still image (for example, the icon can include a small image of a filmstrip). Thus, as used herein, the term "images" is a broad term and refers to both images and videos, and can include, but is not limited to, static images, still-frame or freeze-frame images from a video, or videos. A user can indicate a geographic region of interest, for example, by submitting a search request using a search box 105, by zooming into or out of the currently displayed geographic region using a zoom level selector 115, or by clicking and dragging a mouse pointer to pan the map to a different geographic region of interest. In some embodiments, the geographic region and map images may be provided, for example, by a geographic location service such as Google Maps (available from Google, Inc., Mountain View, Calif.) or MapQuest (available from Mapquest, Inc., Denver, Colo.), by a Global Positioning System (GPS) service, or the like.

In the illustrated embodiment, a filmstrip image viewer 135 is displayed below the geographic region of interest. The filmstrip image viewer 135 may display a set of the overhead images 125 which correspond to the currently displayed geographic region on the map 120. In one embodiment, the set of overhead images displayed in the filmstrip image viewer 135 may be updated, replaced, or refreshed when the user indicates or specifies a different geographic region of interest, for example using the various user interface elements described herein (e.g. the search box 105, the zoom level selector 115, or by panning the map using the mouse click-and-drag feature, or by a touch and/or swipe gesture via a touch-enabled screen). Thus, the set of overhead images displayed to the user may be updated dynamically and automatically as the user navigates or browses the map. Once the user has found a particular geographic region of interest, the set of overhead images displayed in the filmstrip image viewer 135 may be updated and provide the user with the set of overhead images most relevant to the user's browsing.

For example, the user may use the search box 105 to search for overhead images in Maui, Hi. In response to this search request, the interactive system 700 may update the map 120 to display the geographic region corresponding to Maui, Hi., and update the filmstrip image viewer 135 with a set of overhead images corresponding to the displayed geographic region. Once this view is updated, the user may decide to pan the map using the mouse click-and-drag feature (or touch and/or swipe gesture via a touch-enabled screen) to view the nearby island of Lanai, Hi., or to zoom the map using the zoom level selector 115 on the mountain of Haleakala. In any of these interactions, the map may be automatically updated to display the selected geographic region of interest, and the filmstrip image viewer 135 may be automatically refreshed with overhead images corresponding to the selected geographic region. For example, if a zoom-in operation is performed to limit the map display 120 to a specific area, images that do not correspond to that specific area may be removed from the filmstrip image viewer.

The user interface depicted in FIG. 1 also provides a search filter 110 which the user can use to filter the images displayed in the filmstrip image viewer 135. Upon selecting the search filter 110, a filter criteria popup box, such as a filter criteria selection box 300 as illustrated in FIG. 3, may appear. In some embodiments, the set of overhead images displayed in the filmstrip image viewer 135 may be updated, replaced, or refreshed when the user changes or selects various search filter criteria provided by the filter criteria selection box.

In some embodiments, the set of overhead images corresponding to the geographic region of interest on the map 120 may be larger than the available space on the filmstrip image viewer 135. For example, the filmstrip image viewer 135 may be able to display up to 10 images, while the full set of overhead images available for display is more than 10. Thus, in some embodiments, and as illustrated in FIG. 1, the filmstrip image viewer 135 may include one or more scrolling arrows 130, which enable the user to scroll the filmstrip image viewer and to browse further overhead images in the set. In other embodiments, the filmstrip image viewer 135 may include multiple rows (or columns) to display additional images.

In the illustrated embodiment, the filmstrip image viewer 135 is displayed at the bottom of the page. However, the filmstrip image viewer 135 could also be displayed, for example, across the top of the page, or arranged vertically, or in any other variation. Further, multiple rows or columns of images could be displayed.

In FIG. 1, the user can view an overhead image in more detail by selecting (e.g., clicking, double-clicking, checking a selection box) a desired overhead image on the filmstrip image viewer 135. In response, the illustrative user interface depicted in FIG. 2 may be displayed.

FIG. 2 illustrates one embodiment of a user interface 200 that enables a user to view detail for a selected overhead image 226 for a geographic region of interest displayed on a map 220, and to continue browsing overhead images. In this embodiment, the selected overhead image 226 is displayed over the map 220 in a selected overhead image box 225 aligned with the geographic region of interest. The selected overhead image box 225 may be an at least partially transparent box. The at least partially transparent box may allow features in the map 120 (or other background portions of the user interface) to at least partially show through the box 225. Use of the overhead image box 225 provides the user with a context-specific view of the selected overhead image 226 in relation to the geographic region of interest. If the selected image is a video, the user interface 200 may provide functionality to "play" the video. For example, the image box 225 may include video controls to play, pause, stop, rewind, fast forward, or repeat the video. In some implementations, the video may automatically start to play after the user selects the video from the filmstrip image viewer 135.

In some embodiments, the selected overhead image 226 may be significantly larger or smaller than the original geographic region of interest displayed in the user interface of FIG. 1. In such embodiments, the interactive system 700 may refresh the map 220 to display a geographic region which scales with the selected overhead image. For example, as illustrated in FIG. 2, the selected overhead image 226 is of the east side of the island of Lanai, a small island to the west of Maui as illustrated in FIG. 1. In response to selecting the selected overhead image 225, the interactive system 700 automatically determines the matching geographic region and refreshes the map 220 with the geographic region in scale with the selected overhead image. Thus, the user can quickly and efficiently browse overhead images and receive immediate visual indication of the exact geographic region for any selected overhead image.

In some implementations, a still image can be displayed using a pyramid resolution segmentation approach in which a hierarchical set of image "tiles" is used to display images of a region of interest. Each tile can be the same number of pixels; however, the spatial resolution of each pixel can increase with each successive pyramid. In this approach, regardless of the spatial resolution that a user is viewing the image with, the bandwidth used to deliver the image data to the user remains substantially constant. Overhead images may be ortho-rectified to correct for, e.g., topographic relief, imaging system distortion, tilt of the overhead imaging platform or sensor relative to the region of interest, etc. Ortho-rectified images can roughly correspond to the image that would be observed if the imaging sensor were directly above the region of interest and "looking" straight down. In some implementations, the user interface can provide ortho-rectified video using a pyramid segmentation approach with settings to account for different user system communication bandwidths.

As further depicted in FIG. 2, the user may share the selected overhead image by clicking on the share icon 240, or view detail for the selected overhead image by, for example, clicking on the "i" icon 245. In other embodiments these icons may be represented in various different ways and displayed in different places on the user interface, or may be omitted. When the user clicks on the share icon 240, the user may be presented with options to share the selected overhead image or detail about the image, for example by email, text message, or by posting to a preferred social networking website. The interactive system 700 could also host its own social networking system that, for example, enables users to connect to and share images and comments with other users of the system, view comments posted by other users, and the like.

When the user clicks on the "i" icon 245, the user may be presented with a popup box displaying various detail information about the selected overhead image 226. For example, information displayed may include degree of cloud cover, degree of blur, panchromatic resolution, multi-resolution of the image, spectral or multispectral resolution, spectral bandwidth, sun azimuth, sun elevation, platform, date the image was captured, and the name of the image source provider. In some embodiments, the user may be presented with additional options of features not depicted in FIG. 2, including, for example, options to purchase and/or download selected overhead images. In some embodiments, one or more buttons or icons, such as a "like" button or a sequence of 1 to 5 stars, may be provided for enabling users to provide feedback on particular images, the user interface may display the associated (image specific) vote tallies or average ratings, and/or the system may use these vote tallies or ratings to rank/order the images for display on the filmstrip or in search results. Where the images are available for purchase, the system could also maintain purchase statistics for particular images. These statistics could, for example, be used in a similar manner to the vote tallies or ratings to provide indications of popular images. The user interface could also provide an option for users to tag particular images and/or to post comments on particular images. The tags and/or comments could be included in the search index that is used to process image search queries.

FIG. 2 also illustrates one embodiment of a mechanism to enable users to continue browsing the current set of overhead images corresponding to the geographic region of interest. For example, scrolling arrows 230 may be utilized by the user to move to a previous or next image in the current set of overhead images as originally presented in the filmstrip image viewer 135 of FIG. 1. In response to clicking on the scrolling arrows 230, the interactive system 700 automatically determines the matching geographic region and refreshes the map 220 with the geographic region in scale with the selected overhead image, as discussed herein.

In some embodiments of the user interface depicted in FIG. 2, the user may return to the search results as illustrated, for example, in FIG. 1, by clicking on the "Search Results" button 235. In some embodiments the user may return to the search results by clicking on an "X" button 227 to close the selected overhead image display box 225, or by pressing a key (e.g. "Esc") on a keyboard. In response to a request to return to the search results, the interactive system 700 may again display the user interface as shown, for example, in FIG. 1. The selected overhead image display box 225 may be removed or hidden from view, the map 220 may be refreshed and repositioned to display the original geographic region of interest, and the filmstrip image viewer 135 may be displayed.

Also depicted in FIG. 2 and similar to the user interface depicted in FIG. 1, the user can locate a geographic region of interest, for example, by submitting a search request using a search box 205, by zooming into or out of the currently displayed geographic region and the selected overhead image using a zoom level selector 215, or by clicking and dragging a mouse pointer to pan the map to a different geographic region of interest. Different variations on the behavior of these actions may be possible. For example, in response to a search request submitted using the search box 205, the user interface of FIG. 1 may be displayed with the requested geographic region of interest and the filmstrip image viewer 135 with a refreshed set of corresponding overhead images. In another example, in response to zooming using the zoom level selector 215 the user interface may refresh with zoom detail for the currently displayed geographic region and the selected overhead image. In another example, in response to zooming using the zoom level selector 215 the user interface of FIG. 1 may be displayed with zoom detail for the currently displayed geographic region and the filmstrip image viewer 135 with a refreshed set of corresponding overhead images.

The user interface depicted in FIG. 2 also provides a search filter 210 which the user can use to filter the images displayed in the filmstrip image viewer 135. Upon selecting the search filter 210, a filter criteria popup box, such as a filter criteria selection box 300 as illustrated in FIG. 3, may appear. In some embodiments, the filmstrip image viewer 135 of FIG. 1 may be displayed, updated, replaced, or refreshed when the user changes or selects various search filter criteria provided by the filter criteria selection box.

FIG. 3 illustrates one embodiment of a user interface that enables a user to filter search criteria for browsing overhead images for a geographic region of interest via a filter criteria selection box 300. As depicted, the user can filter a search for matching overhead images by a date range 305, by degree of cloud cover 310, by the degree of the slant angle 315 at which an image was captured, the source of the image 320 (e.g., to enable searching of third-party image provider databases), the resolution 325 of the image including panchromatic resolution 326 or multi-resolution 327 of images (or pyramids, layers, or tiles in the image), the lighting conditions 330 under which the image was captured including the sun azimuth 331 and sun elevation 332, and collection geometry 335 data. For example, the image source 320 can include information indicating the name of the source from which overhead images are obtained, such as Skybox Imaging, Inc. (Mountain View, Calif.), DigitalGlobe, Inc. (Longmont, Colo.), GeoEye, Inc. (Herndon, Va.), SPOT Images (provided by Astrium Services GEO-Information Division, Chantilly, Va.), etc.

Other filter criteria not depicted in FIG. 3 may also be used and may be, for example, based on metadata related to the images, including image ratings, user feedback, and/or user tags. Other filter criteria can include image price or price range. As discussed herein, in some embodiments, the filmstrip image viewer 135 of FIG. 1 may be displayed, updated, replaced, or refreshed when the user changes or selects various search filter criteria provided by the filter criteria selection box 300.

In addition to the example user interfaces depicted in FIGS. 1, 2, and 3, the interactive system 700 may provide other functionality through different user interfaces. For example, a user interface may be provided to allow authorized users to upload new images to the interactive system 700, or to specify new sources for images to be made available to users of the interactive system 700. Also, user interfaces may be provided for users to purchase images (e.g., by sale or license). Such user interfaces may include a shopping cart interface with payment options, a wishlist for storing lists of images desired in the future, and so forth.

Examples of Methods Performed by Overhead Image Viewing Systems

Figure 4:
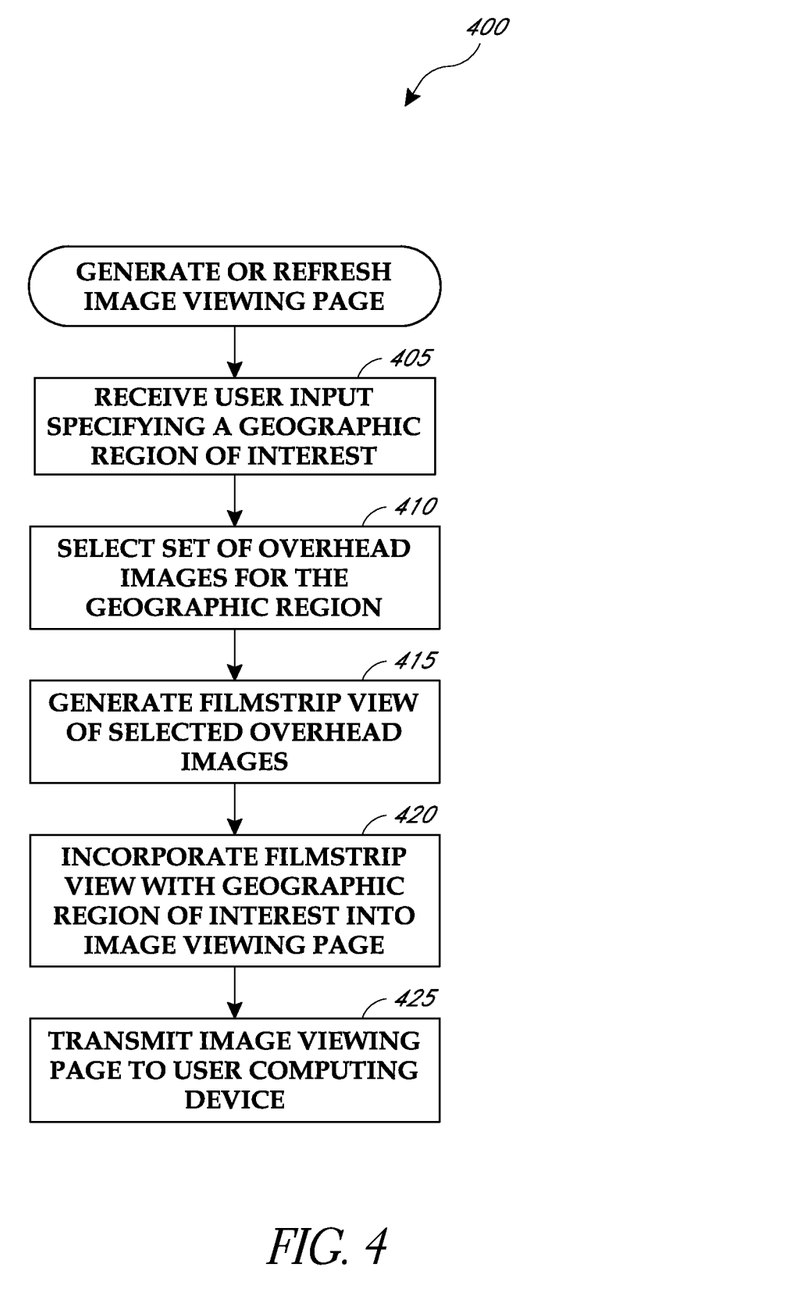
FIG. 4 illustrates one embodiment of a process that may be implemented by an interactive system, such as the interactive system of FIG. 7, to generate a user interface, such as the user interface of the type shown in FIG. 1, for browsing overhead images for a geographic region of interest.
Figure 5:
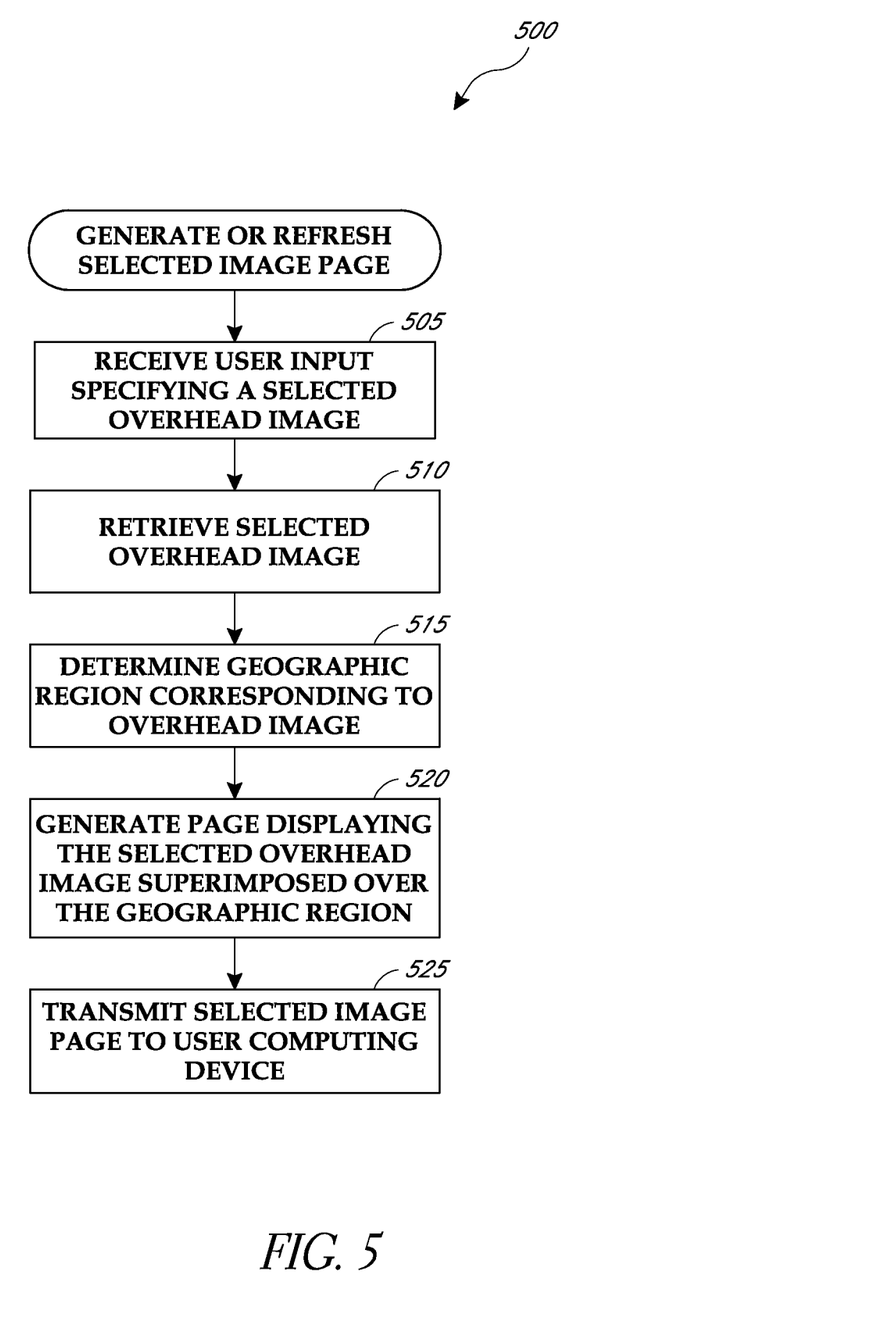
FIG. 5 illustrates one embodiment of a process that may be implemented by an interactive system, such as the interactive system of FIG. 7, to generate a user interface, such as the user interface of the type shown in FIG. 2, for viewing a selected image.
Figure 6:
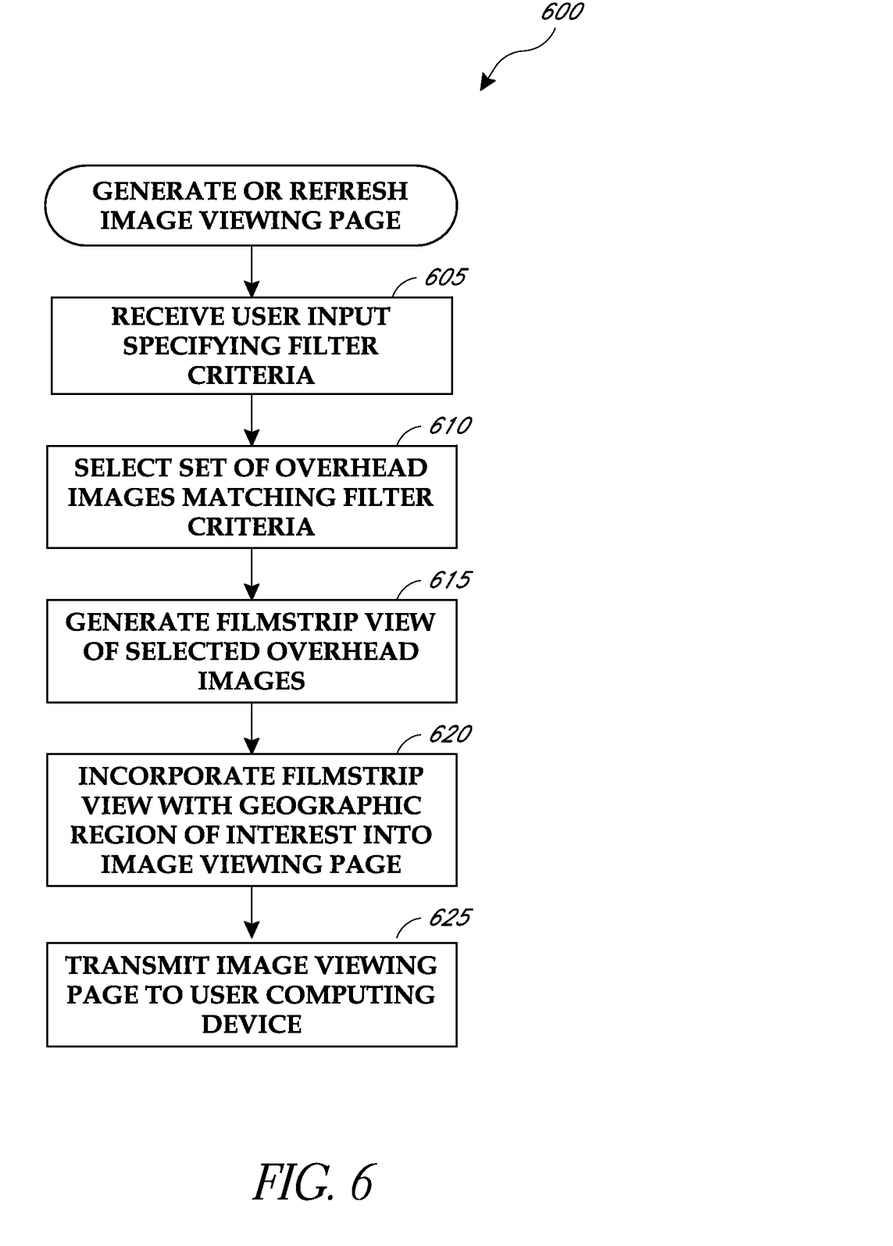
FIG. 6 illustrates one embodiment of a process that may be implemented by an interactive system, such as the interactive system of FIG. 7, to filter images and generate a user interface, such as the user interface of the type shown in FIG. 1, for browsing a filtered set of overhead images for a geographic region of interest.

FIGS. 4, 5, and 6 schematically illustrate various embodiments of processes that may be implemented by an interactive system to generate user interfaces (such as the examples described above) for viewing, browsing, and selecting overhead images. In some implementations, the routines are performed by embodiments of the interactive system 700 described with reference to FIG. 7 or by one of its components, such as the image view module 790. For ease of explanation, the following describes the services as performed by the interactive system 700. The example scenarios are intended to illustrate, but not to limit, various aspects of the interactive system 700.

FIG. 4 illustrates a process 400 that may be implemented by an interactive system 700 to generate a user interface, such as the user interface of the type shown in FIG. 1, for browsing overhead images for a geographic region of interest. This process may be executed whenever a user computing system 722 requests a geographic region view page 100 or requests a refresh of such a page. Beginning at block 405, the interactive system 700 receives user input specifying a geographic region of interest. For example, the user input may be provided manually if/when a user searches for a particular region using a search box 105. In another example, the user input may be provided automatically if/when the user pans or zooms around the displayed map 120 in order to navigate to a different geographic region of interest.

Once the interactive system 700 receives the user input, at block 410 the interactive system 700 selects a set of overhead images which correspond to the geographic region of interest. The overhead images may be stored, for example, in data source(s) 770, or cached locally in a mass storage device 720 for quicker retrieval. The overhead images may include metadata, such as a shape file which provides geolocation information to enable searching to match the geographic region of interest. Other metadata associated with an overhead image may include, for example, cloud cover, slant angle, image resolution, the date the image was taken, lighting conditions, collection geometry, other data used to identify and describe conditions under which the image was taken, average user ratings, vote tallies, user comments and/or feedback, and tags.

At block 415, the interactive system 700 generates a filmstrip view of the selected overhead images matching the geographic region of interest. The filmstrip view may include a limited number or subset of the selected images, depending on factors such as the screen resolution of the user computing system 722, the file size of the images, and the speed of the network 760 connecting the interactive system 700 to the user computing system 722. The system 700 may provide a graphic, icon, drop-down box, or the like to allow the user to choose whether the filmstrip view displays still images, videos, or both still images and videos. The interactive system 700 may also generate smaller thumbnail versions of the selected images for the filmstrip view. In some embodiments, the selected images may be arranged in the filmstrip according to parameters, such as by date, degree of cloud cover, by type (e.g., still image or video), etc. The arrangement parameters may be user-selected or determined by the interactive system.

At block 420, the interactive system 700 incorporates the generated filmstrip view with the currently selected geographic region of interest into the geographic region view page 100. For example, as shown in FIG. 1, the filmstrip view may be incorporated into the geographic region view page 100 at the bottom of the user interface; however, in other embodiments, the filmstrip view may be incorporated into the geographic region view page 100 in different configurations, including but not limited to horizontally at any position in the user interface (e.g., top, middle, bottom, etc.), vertically at any position in the user interface (e.g., left, middle, right, etc.), diagonally at any position in the user interface. At block 430, the image viewing page 100 is transmitted by the interactive system 700 to the requesting user computing system 722 for display.

FIG. 5 illustrates a process 500 that may be implemented by the interactive system 700 to generate another user interface, such as the user interface of the type shown in FIG. 2, for viewing a selected image for a geographic region of interest. This process may be executed whenever a user computing system 722 requests a selected image view page 200 or requests a refresh of such a page.

Beginning at block 505, the interactive system 700 receives user input specifying a selected overhead image of interest. For example, the user input may be provided manually if/when a user requests a particular overhead image by clicking on a thumbnail presented in a filmstrip image viewer 135 of FIG. 1. Once the interactive system 700 receives the user input, at block 510 the interactive system 700 retrieves the selected overhead image from, for example, data source(s) 770, or the local cache in a mass storage device 720 for quicker retrieval. The selected overhead image may include metadata, such as shape data which provides geolocation information to enable searching to match the geographic region of interest. Other metadata associated with an overhead image, discussed herein, may also be retrieved at block 510. In one embodiment, geolocation information may be provided by the user or otherwise accessed from the user's computing device. Geolocation information may include one or more geographic location indicators (e.g., Global Positioning System ("GPS") coordinates, street, city, state, and/or any other information which provides an indication of geographic location.

At block 515, the interactive system 700, using the associated geolocation information, determines the geographic region corresponding to the selected overhead image. At block 520, the interactive system 700 generates a page displaying the selected overhead image superimposed over the corresponding geographic region. The page may also include various user interface elements to enable further browsing of images and/or image detail for the selected overhead image. At block 525, the image viewing page 100 is transmitted by the interactive system 700 to the requesting user computing system 722 for display.

FIG. 6 illustrates a process 600 that may be implemented by the interactive system 700 to generate a user interface, such as the user interface of the type shown in FIG. 1, for browsing a filtered set of overhead images for a geographic region of interest. This process may be executed whenever a user computing system 722 submits filter criteria for a geographic region view page 100 or a selected image view page 200 or requests a refresh of such a page.

Beginning at block 605, the interactive system 700 receives user input specifying filter criteria to narrow or broaden a search for a set of overhead images which correspond to a geographic region of interest. The filter criteria may include, for example, the filter criteria displayed to the user in the user interface of FIG. 3. The filter criteria may be based on metadata about the overhead images, as described herein.

Once the interactive system 700 receives the user input, at block 610 the interactive system 700 retrieves a set of overhead images from, for example, data source(s) 770, or the local cache in a mass storage device 720 for quicker retrieval, where the set of overhead images includes overhead images meeting the filter criteria and which correspond to the geographic region of interest.

At block 615, the interactive system 700 generates a filmstrip view of the selected overhead images. The filmstrip view may include a limited number or subset of the selected images, depending on factors such as, e.g., the screen resolution of the user computing system 722, the file size of the images, and the speed of the network 760 connecting the interactive system 700 to the user computing system 722, whether still images and/or videos are selected for display by the user. The interactive system 700 may also generate smaller thumbnail versions of the selected images for the filmstrip view. In some embodiments, the selected images may be arranged in the filmstrip according to parameters, such as by date, degree of cloud cover, etc. The arrangement parameters may be user-selected or determined by the interactive system 700.

At block 620, the interactive system 700 incorporates the generated filmstrip view with the currently selected geographic region of interest into the geographic region view page 100. At block 630, the image viewing page 100 is transmitted by the interactive system 700 to the requesting user computing system 722 for display.

In the illustrative processes described in FIGS. 4, 5, and 6, appropriate JavaScript or other executable code may also be included for updating the user interface pages based on mouse-over events, image browse and selection events, page refresh events, and other types of user-driven events. In some embodiments, the image viewing page or interfaces 100, 200, and/or 300 may alternatively be constructed in whole or in part by a user computing system 722 based on information received from the interactive system 700. For example, a mobile map app may generate the display page on a smartphone or a tablet device.

Examples of Overhead Image Viewing Systems

Figure 7:
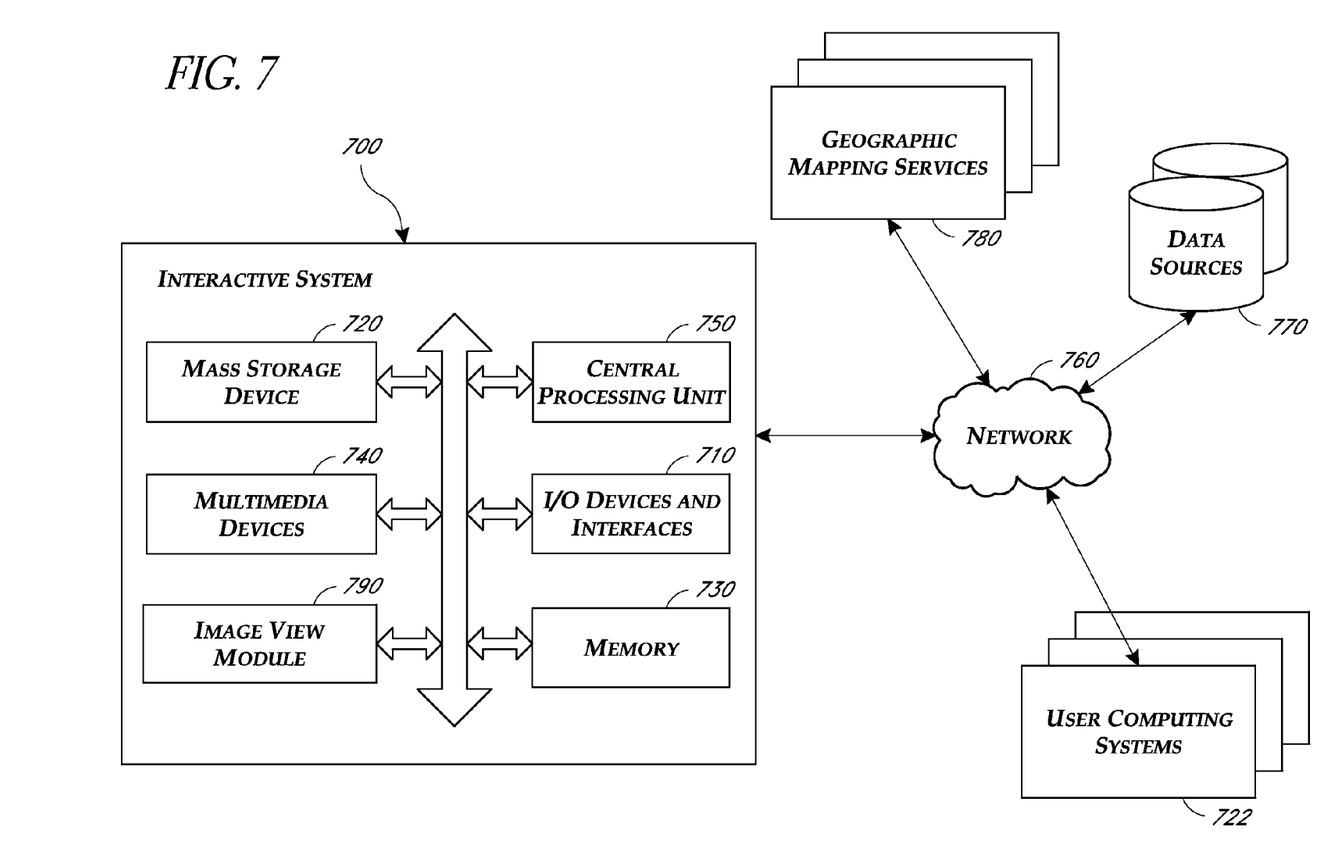
FIG. 7 illustrates the general architecture of an example interactive system that provides overhead image browsing interfaces of the type show in FIGS. 1, 2, and 3.

FIG. 7 illustrates one embodiment of an interactive system 700 that provides the above-described features. The interactive system 700 may be implemented as a computing system that comprises one or more programmed computing devices, including one or more physical servers that respond to requests from user devices 722. In some cases, the interactive system 700 may include computing devices that are remote from one another. The interactive system 700 may be used to implement one or more of the systems and methods described herein, including embodiments of the processes 400, 500, and 600. In addition, in one embodiment, the interactive system 700 may be configured to process image files. The interactive system 700 may also provide user interfaces and functionality to enable users to setup user accounts, purchase images (e.g., via credit card transactions), save favorite images to a personal archive, establish connections with other users of the interactive system 700, and other functionality described herein. While FIG. 7 illustrates one embodiment of a computing system 700, it is recognized that the functionality provided for in the components and modules of interactive system 700 may be combined into fewer components and modules or further separated into additional components and modules.

In one embodiment, the interactive system 700 comprises an image view module 790 that carries out the functions, methods, and/or processes described herein (including embodiments of the processes 400, 500, and 600). The image view module 790 may be executed on the interactive system 700 by a central processing unit 750 discussed further below.

Computing System Components

In one embodiment, the processes, systems, and methods illustrated above may be embodied in part or in whole in software that is executed on a computing system. The functionality provided for in the components and modules of the computing system may comprise one or more components and/or modules. For example, the computing system may comprise multiple central processing units (CPUs) and mass storage devices, such as may be implemented in an array of physical servers.

In general, the word "module," as used herein, refers to logic embodied in hardware or firmware, or to a collection of software instructions, possibly having entry and exit points, written in a programming language, such as, for example, Java, C or C++, or the like. A software module may be compiled and linked into an executable program, installed in a dynamic link library, or may be written in an interpreted programming language such as, for example, BASIC, Perl, Lua, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

In one embodiment, the interactive system 700 also comprises a mainframe computer suitable for controlling and/or communicating with large databases, performing high volume transaction processing, and generating reports from large databases. The interactive system 700 also comprises a central processing unit ("CPU") 750, which may comprise a conventional microprocessor. The interactive system 700 further comprises a memory 730, such as random access memory ("RAM") for temporary storage of information and/or a read only memory ("ROM") for permanent storage of information, and a mass storage device 720, such as a hard drive, diskette, optical media storage device, non-volatile computer storage (e.g., flash memory), and so forth. Typically, the modules of the interactive system 700 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

Computing System Device/Operating System

The interactive system 700 may include a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The interactive system 700 is generally controlled and coordinated by operating system software, such as z/OS, Windows 95, Windows 98, Windows NT, Windows 2000, Windows XP, Windows Vista, Linux, BSD, SunOS, Solaris, or other compatible operating systems. In Macintosh systems, the operating system may be any available operating system, such as MAC OS X. In other embodiments, the interactive system 700 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 7, the interactive system 700 is coupled to a network 760, such as a local area network (LAN), wide area network (WAN), or the Internet, for example, via a wired, wireless, or combination of wired and wireless, communication link. The network 760 communicates with various computing devices and/or other electronic devices via wired or wireless communication links. In the example embodiment of FIG. 7, the network 760 is configured to communicate with one or more user computing systems 722 and/or one or more data sources 770.

Access to the image view module 790 of the interactive system 700 by user computing systems 722 and/or by data sources 770 may be through a web-enabled user access point such as the user computing systems' 722 or data sources' 770 personal computer, cellular phone, laptop, tablet, or other device capable of connecting to the network 760. Such a device may have a browser module implemented as a module that uses text, graphics, audio, video, and other media to present data and to allow interaction with data via the network 760.

The browser module or other output module may be implemented as a combination of an all points addressable display such as a cathode-ray tube (CRT), a liquid crystal display (LCD), a plasma display, or other types and/or combinations of displays. In addition, the browser module or other output module may be implemented to communicate with input devices and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module or other output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the interactive system without communications over the Internet, a WAN, or LAN, or similar network.

In some embodiments, the system 700 may comprise a physical or logical connection established between a remote microprocessor and a mainframe host computer for the express purpose of uploading, downloading, or viewing interactive data and databases on-line in real time. The remote microprocessor may be operated by an entity operating the computer system 700, including the client server systems or the main server system, an/or may be operated by one or more of the data sources 770 and/or one or more of the computing systems. In some embodiments, terminal emulation software may be used on the microprocessor for participating in the micro-mainframe link.

In some embodiments, user computing systems 722 who are internal to an entity operating the computer system 700 may access the image view module 790 as an application or process run by the CPU 750.

Other Systems

In addition to the systems that are illustrated in FIG. 7, the network 760 may communicate with other data sources or other computing devices. The interactive system 700 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

In some embodiments, the acts, methods, and processes described herein are implemented within, or using, software modules (programs) that are executed by one or more general purpose computers. The software modules may be stored on or within any suitable computer-readable medium including computer-generated signals or non-transitory computer storage. It should be understood that the various steps or blocks may alternatively be implemented in-whole or in-part within specially designed hardware.

As will be apparent, many variations on the interactive system 700 described above are possible. For example, in one embodiment, the interactive system 700 may be configured to store, in the data source(s) 770 and/or the mass storage device 720, the user's searches for later re-use or retrieval. In another embodiment, the image viewing interfaces 100, 200 may be configured to display a "heat map" of overhead images corresponding to a geographic region of interest, such that the heat map represents the density of overhead images per area or location in the geographic region of interest. For example, the heat map may indicate a color (e.g. red) for a higher density of overhead images available for a region and another color (e.g. blue) for a lower density of overhead images available for the region. The heat map may, additionally or alternatively, include graphics (e.g., circles) whose size (e.g., diameter) corresponds to density (e.g., larger circle diameter corresponds to larger density).

The various components shown in FIG. 7, and the various processes described above (including those shown in FIGS. 4, 5, and 6) may be implemented in a computing system via an appropriate combination of computerized machinery (hardware) and executable program code. For example, the image view module 790 may each be implemented by one or more physical computing devices (e.g., servers) programmed with specific executable service code. Each such computing device typically includes one or more processors capable of executing instructions, and a memory capable of storing instructions and data. The executable code may be stored on any appropriate type or types of non-transitory computer storage or storage devices, such as magnetic disk drives and solid-state memory arrays. Some of the services and functions may alternatively be implemented in application-specific circuitry (e.g., ASICs or FPGAs). The various databases and data repositories 770, 720 shown in FIG. 7 may be implemented using relational databases, flat file systems, tables, and/or other types of storage systems that use non-transitory storage devices (disk drives, solid state memories, etc.) to store data. Each such data repository may include multiple distinct databases. In a typical implementation, the overhead images searched and provided to users, including the overhead images presented by the image viewing interfaces 100, 200, 300, are based on an automated analysis of from hundreds, to thousands, to many millions of stored captured images. As explained above, the image viewing interfaces 100, 200, 300 may, in some embodiments, be implemented partly or wholly in client-side application code that runs on users' computing devices.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A computer-implemented method for providing an overhead image browsing user interface, the computer-implemented method comprising:
   under control of an overhead image viewing system comprising computing hardware including one or more processors:
   receiving a first user input selecting a first geographic region of interest;
   in response to the first user input, outputting for display (1) a master image of the geographic region of interest, and (2) a representation of one or more overhead images that are separate images from the master image and available for selection to be displayed over the master image aligned with the geographic region of interest,
   wherein each of the one or more overhead images depict a portion of the first geographic region of interest, and wherein the one or more images comprise images captured by satellites that depict a smaller area of the first geographic region of interest than the master image of the first geographic region of interest, the smaller area being contained within the first geographic region of interest,
   wherein the one or more overhead images comprise ortho-rectified images, and wherein each of the one or more overhead images comprise metadata that provides geolocation information for matching to the first geographic region of interest;

receiving a second user input selecting one of the one or more overhead images of the representation;

responding to the second user input by outputting for display the master image in a first scale and repositioned visually with the selected overhead image and the selected overhead image superimposed directly over a portion of the master image that geographically corresponds to the selected overhead image such that the geographically-corresponding portion of the master image is no longer visible and the smaller area of the first geographic region of interest of the selected image is in more detail than the first geographic region of interest of the master image wherein the first scale corresponds to the selected overhead image;

receiving a third user input selecting a second geographic region of interest different from the first geographic region of interest;

generating an updated representation in response to the third user input, wherein the updated representation comprises at least one overhead image that depicts a portion of the second geographic region of interest and comprises metadata that provides geolocation information for matching to the second geographic region of interest; and outputting the updated representation for display, wherein the at least one overhead image is available for selection to be superimposed in a second scale with the second geographic region of interest and wherein the second scale corresponds to the at least one overhead image.

2. The computer-implemented method of claim 1, wherein outputting for display the master image with the selected overhead image further comprises outputting for display a second master image corresponding to the selected overhead image, the second master image replacing the master image of the geographic region of interest.

3. The computer-implemented method of claim 1, wherein the overhead images comprise one or more of: (1) static images, (2) still-frame or freeze-frame images from a video, or (3) videos.

4. The computer-implemented method of claim 1, wherein the representation of the one or more overhead images comprises a filmstrip image viewer that includes the representation of the one or more overhead images.

5. The computer-implemented method of claim 4, wherein the filmstrip image viewer is configured for one or more of the following: selecting a representation of a particular overhead image or scrolling the representations of the one or more overhead images within the filmstrip image viewer.

6. An interactive system for overhead image browsing, the system comprising:

a physical computing system comprising one or more computing devices that provides network-based access to an electronic catalog of overhead images, said computing system providing a user interface that includes functionality for users to browse overhead images; and an overhead image viewing service that enables the users to browse a set of overhead images with a map of a first geographic region of interest, the set of overhead images being separate images from the map, wherein each of the set of overhead images depict a portion of the first geographic region of interest and comprise images captured by satellites that depict a smaller area of the first geographic region of interest than the map of the first geographic region of interest, the smaller area being contained within the first geographic region of interest, wherein the set of overhead images comprise ortho-rectified images, and wherein each of the set of overhead images comprise metadata that provides geolocation information for matching to the first geographic region of interest;

the computing system configured to:

receive a first user input selecting the first geographic region of interest, generate, for a user, a page that provides functionality for the user to browse the map of the first geographic region of interest and a representation of one or more of the set of overhead images, receive a second user input selecting an overhead image, in response to the second user input, output for display the selected overhead image superimposed directly over a portion of the map that geographically corresponds to the selected overhead image such that the portion of the map is no longer visible, wherein the map is repositioned visually with the selected overhead image and in a first scale with the selected overhead image and the smaller area of the first geographic region of interest of the selected overhead image is in more detail than shown in the map of the first geographic region of interest, wherein the first scale corresponds to the selected overhead image;

receive a third user input selecting a second geographic region of interest different from the first geographic region of interest;

generating an updated representation in response to the third user input, wherein the updated representation comprises at least one overhead image that depicts a portion of the second geographic region of interest and comprises metadata that provides geolocation information for matching to the second geographic region of interest; and outputting the updated representation for display, wherein the at least one overhead image is available for selection to be superimposed in a second scale with the second geographic region of interest and wherein the second scale corresponds to the at least one overhead image.

7. The interactive system of claim 6, wherein the computing system is further configured to generate the updated representation in response to the user browsing the map to the second geographic region of interest.

8. The interactive system of claim 6, wherein the generated page includes a second map of the geographic region of interest corresponding to the selected overhead image, the second map replacing the map on the page.

9. The interactive system of claim 6, wherein the representation comprises a filmstrip that includes the one or more overhead images.

10. The interactive system of claim 6, wherein the overhead images comprise one or more of: (1) static images, (2) still-frame or freeze-frame images from a video, or (3) videos.

11. The interactive system of claim 6, wherein the user interface is configured for display on a touch sensitive computing device.

12. Non-transitory computer storage that stores a user interface that provides functionality for a user to browse overhead images, the user interface including:

a map displaying a representation of a first geographic region of interest;

a user-selectable representation of a set of overhead images that are separate images from the map, the user-selectable representation corresponding to the first geographic region of interest, and wherein each of the set of overhead images depict a portion of the first geographic region of interest and comprise images captured by satellites that depict a smaller area than the map of the first geographic region of interest, the smaller area being contained within the first geographic region of interest, wherein the set of overhead images comprise ortho-rectified images, and wherein each of the set of overhead images comprise metadata that provides geolocation information for matching to the first geographic region of interest;

at least one display element for selecting one of the overhead images; and executable code that is:

responsive to a first user input associated with a selection of at least one overhead image by displaying the map repositioned visually with the selected overhead image and in a first scale with the selected overhead image and displaying the selected overhead image superimposed directly over a portion of the map that geographically corresponds to the selected overhead image such that the geographically-corresponding portion of the map is no longer visible and the smaller area of the first geographic region of interest of the selected image is in more detail than shown in the map of the first geographic region of interest, wherein the first scale corresponds to the selected overhead image; and responsive to another user input selecting a second geographic region of interest different from the first geographic region of interest by displaying an updated representation, wherein the updated representation comprises at least one overhead image that depicts a portion of the second geographic region of interest and comprises metadata that provides geolocation information for matching to the second geographic region of interest, wherein the at least one overhead image is available for selection to be superimposed in a second scale with the second geographic region of interest and wherein the second scale corresponds to the at least one overhead image.

13. The non-transitory computer storage of claim 12, wherein the user-selectable representation of the set of overhead images corresponding to the first geographic region of interest comprises a filmstrip that includes the representation of the set of overhead images, wherein each overhead image within the filmstrip is user-selectable to cause display of the overhead image superimposed over the geographically-corresponding portion of the map.

14. The non-transitory computer storage of claim 12, wherein the user interface comprises a web page.

15. The non-transitory computer storage of claim 12, wherein the user interface is embodied in a mobile application.

16. The non-transitory computer storage of claim 12, wherein the user interface is configured for display on a touch sensitive computing device.

17. The non-transitory computer storage of claim 12, wherein the user interface is generated by an overhead image viewing system.

18. The non-transitory computer storage of claim 12, wherein the overhead images comprise one or more of: (1) static images, (2) still-frame or freeze-frame images from a video, or (3) videos.

19. The computer-implemented method of claim 1, wherein the one or more overhead images are filtered based at least in part on at least one of an image rating, user feedback, or a user tag.

20. The computer-implemented method of claim 1, further comprising:

outputting for display a heat map corresponding to the first geographic region of interest, wherein the heat map is indicative of a density of the overhead images per area in the first geographic region of interest.

* * * * *